United States Patent [19]

Uno et al.

[11] 4,033,685
[45] July 5, 1977

[54] FILM READER

[75] Inventors: Keiichi Uno, Tokyo; Mutsuhiro Inoue, Sagamihara, both of Japan

[73] Assignee: Canon Kabushiki Kaisha, Tokyo, Japan

[22] Filed: Dec. 31, 1974

[21] Appl. No.: 537,642

[30] Foreign Application Priority Data

| | | |
|---|---|---|
| Jan. 12, 1974 | Japan | 49-6894 |
| Jan. 12, 1974 | Japan | 49-6895 |
| Jan. 12, 1974 | Japan | 49-6893 |
| Aug. 21, 1974 | Japan | 49-95828 |
| Aug. 30, 1974 | Japan | 49-99683 |

[52] U.S. Cl. ............................... 353/82; 353/26 R; 353/78
[51] Int. Cl.² ............................................. G03B 23/08
[58] Field of Search ....................... 353/25–27, 353/74–78, 120, 82; 350/160 LC, 160 R; 355/45, 5

[56] References Cited

UNITED STATES PATENTS

| 3,475,091 | 10/1969 | Smitzer | 353/26 |
|---|---|---|---|
| 3,692,409 | 9/1972 | Weber | 355/45 |
| 3,708,220 | 1/1973 | Meyers et al. | 350/160 R |
| 3,732,007 | 5/1973 | Kushima et al. | 355/5 |
| 3,824,008 | 7/1974 | Smith | 350/160 LC |
| 3,833,294 | 9/1974 | Kessler | 353/27 |
| 3,844,650 | 10/1974 | Nicholson | 353/120 |
| 3,895,866 | 7/1975 | de Quervine | 353/120 |

Primary Examiner—Harry N. Haroian
Attorney, Agent, or Firm—Fitzpatrick, Cella, Harper & Scinto

[57] ABSTRACT

A film reader, including an irradiator for the film on which information is recorded, an optical system for projecting the information recorded on the film, an information storage body having an electrocromic substance, which changes color when a voltage is applied thereto, mounted between a pair of electrodes for recording and erasing information projected by the optical system, the whole area of the information storage body being irradiated with light.

12 Claims, 30 Drawing Figures

FIG. 6
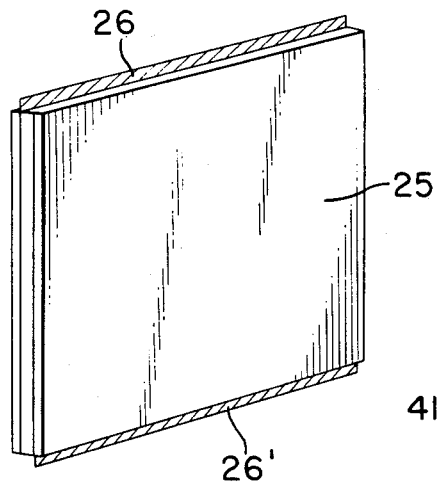
FIG. 8
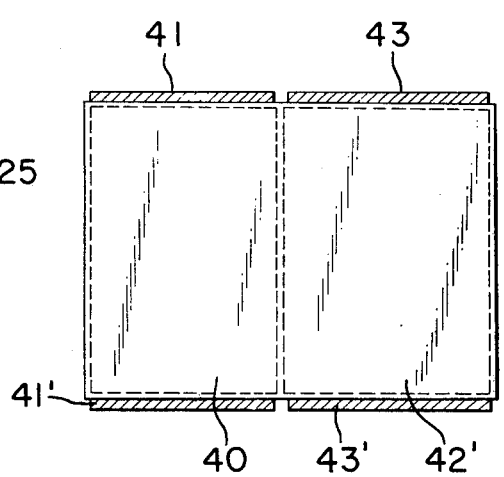
FIG. 7
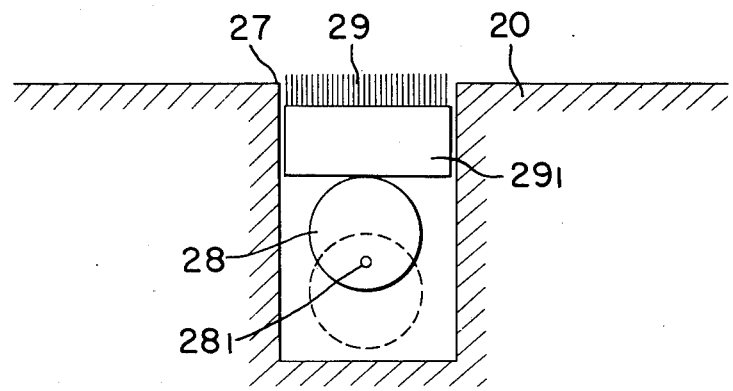
FIG. 9
(A)
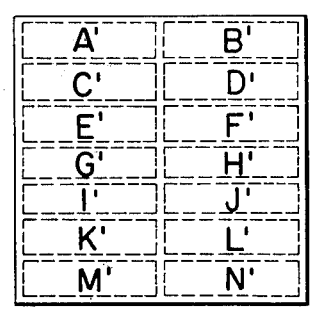
(B)
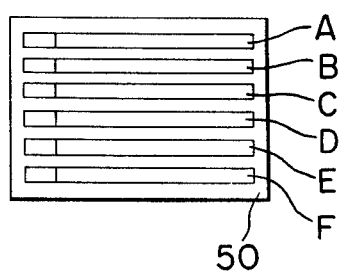

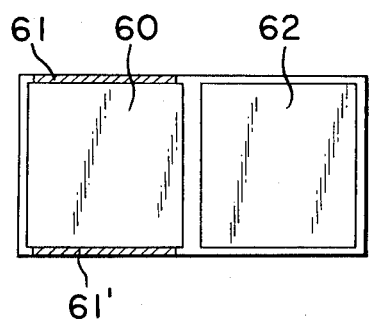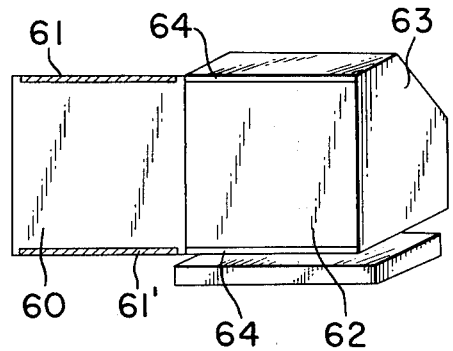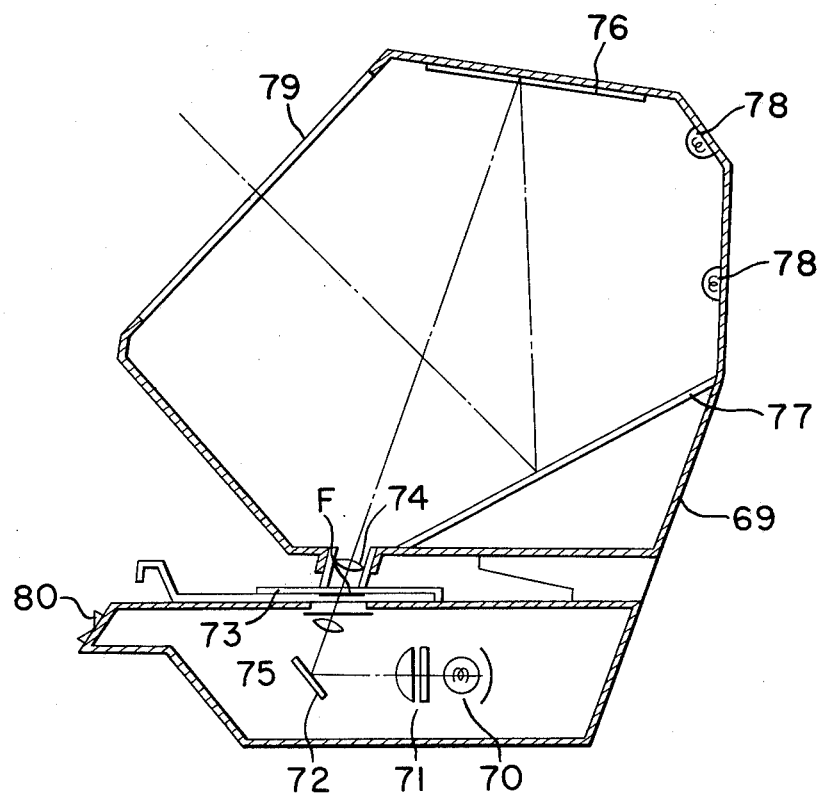

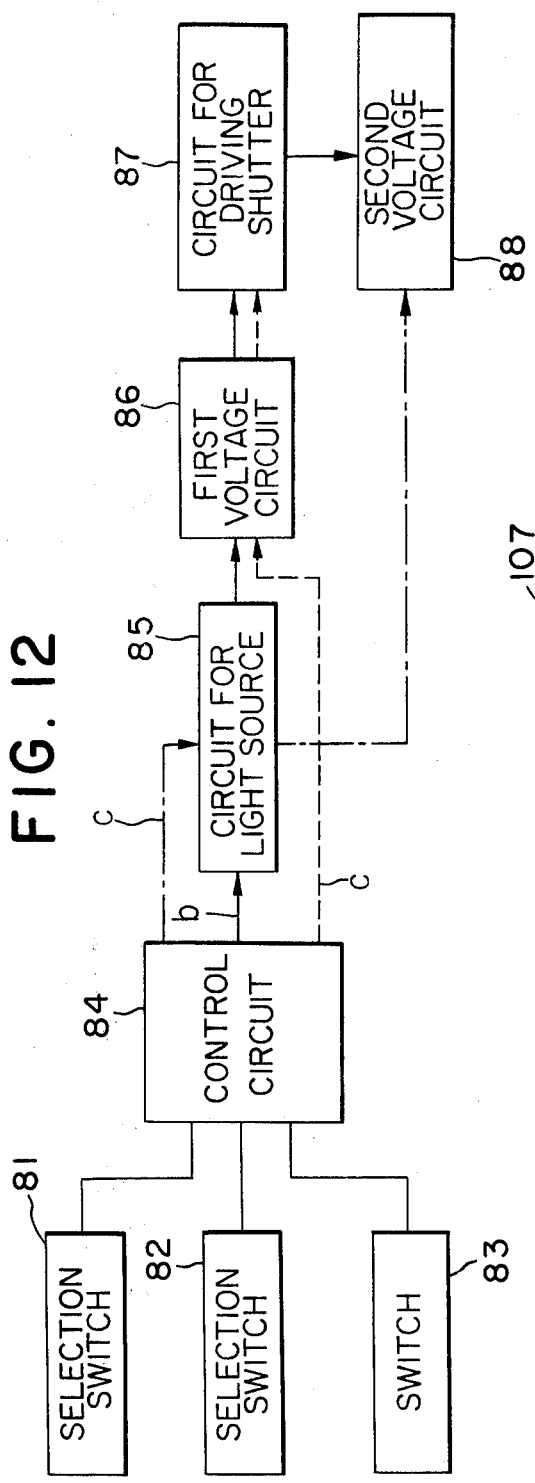
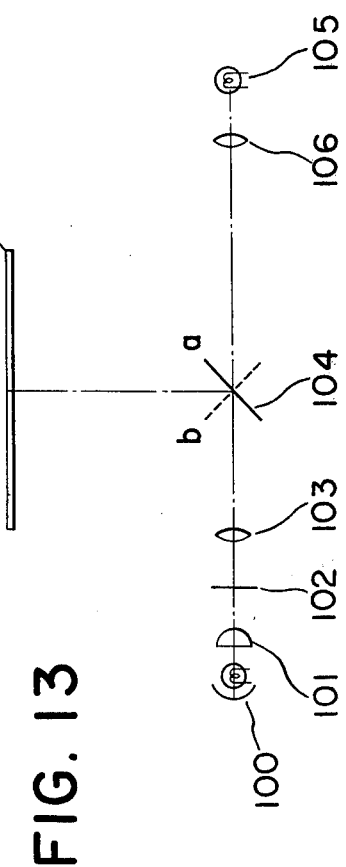

FILM READER

BACKGROUND OF THE INVENTION

1. Field of the Invention

The invention relates to a film reader and, more particularly, to a film reader which records the picture image, on a film, onto a repetitively recordable and erasable information storage body, and observes the image on this information storage body.

2. Description of the Prior Art

An information storage body, as employed in the invention, uses an electricromic material, which changes color as a result of a change in its color absorption characteristic due to the conduction of electric current, and this condition is maintained for a long time even after the interruption of the conduction, and has a property (hereinafter called "electrocromy phenomenon"), depending on the electrical polarity, such as reversibly fading out, or returning to the original color, due to the conduction of the reverse polarity with respect to the former conduction. The degree of the color change corresponds to amount of conduction of the electric current within the range up to the saturation. The mechanism to generate the electrocromy phenomenon is not necessarily a single one. However, in many cases, it is understood as the so-called oxidation-reduction reaction of an electrolyte and a coloring substance. In this case, the electrolyte and coloring substance are not necessarily separated, from a material viewpoint. It may be possible that the coloring substance and the electrolyte are the same substance. Further, from another standpoint, the phenomenon is considered as the change in the light absorption characteristic due to the injection of an injection electron into the color center, similar to the case of photocromic material. Actually, the electrocromy phenomenon is understood to be derived as a result of the combination of the above two.

Since the electrocromy phenomenon serves to electrically change the color, which a material possesses inherently, the combination of colors varies. Further, since the characteristic of a material as to whether it transmits, reflects or scatters the light is not decided by the material's own property, but rather by the forming method of an information storage body having the electrocromic material, when it is used as a display element, either a light transmissive type or a light reflective type is available for use.

The study of the electrocromy phenomenon has become brisk in recent years, because various applications of the phenomenon are considered possible from the above constitutions of the mechanism and the aforementioned variety, and further from the storage characteristic, that the coloring is maintained from the initiation of the coloring to the fading out thereof, and from the fact that there is a material whose coloring is transmitted, corresponding to the impressed voltage value.

The range of materials showing the electrocromy phenomenon is wide and includes either organic or non-organic materials. These materials are all applicable to the invention. The known materials are indicated in the United Kingdom Pat. No. 1,186,541, for example.

SUMMARY OF THE INVENTION

Thus, an object of the invention is to provide a novel film reader, utilizing said information storage body.

It is a further object of the invention to provide a film reader capable of clearly observing a high contrast image under bright environmental conditions.

It is a further object of the invention to provide a film reader capable of temporarily storing a film image, observing the stored image, erasing the image after use, and then using it again for observation.

It is a further object of the invention to provide a film reader capable of optionally combining images of different portions of a film and observing them simultaneously. It is a still further object of the invention to provide a film reader capable of selectively observing the image of a film and the image of a forward negative-positive polarity and an inverse negative-positive polarity by using the same original picture film.

Now the invention will be described, by way of example, in conjunction with the accompanying drawings.

BRIEF DESCRIPTION OF THE DRAWINGS

FIG. 6 is general view of a screen used in FIG. 4.

FIG. 7 is a cross section of the essential part of FIG. 4.

FIG. 8 shows an alternate embodiment of a screen used in the invention.

FIGS. 9A and B show alternate embodiments of a screen and a microfilm.

FIGS. 10A and B show alternate embodiments of a screen and a film reader.

FIG. 11 is a cross section showing an alternate embodiment of a film reader.

FIG. 12 is a control circuit diagram of FIG. 11.

FIGS. 13 – 16 show still other embodiments of the invention.

DESCRIPTION OF THE PREFERRED EMBODIMENTS

Figure 1A:
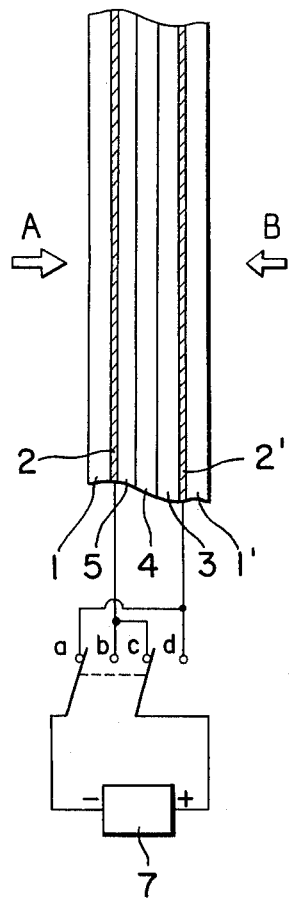
FIGS. 1A and B are block diagrams of an information storage body adopted to the invention.

In FIG. A, reference numerals 1, 1' indicate support bodies, which may be omitted as the case may be. The support body 1, 1' is made of a transparent plate such as a glass and polyester or a film. The elements 2, 2' are electrodes, which are arranged with proper spacing. The electrodes 2, 2' are made of a transparent conductive material such as $SnO_2$ and $In_2O_3$, and laminated on the support body by way of evaporation or by chemical vapor deposition. The element 3 is a coloring layer including electrocromic material, which is composed of a transparent material such as $WO_3$, $MoO_3$ and $TiO_2$ based on evaporation. The element 4 is an electrolyte layer, necessary to return said coloring layer 3 to the original color after the coloring thereof. For this electrolyte, various materials such as $CaF_2$, $ZrO_2$, $TaO_5$, $TiO_2$ and $\beta$ - $Al_2O_3$ are available. The electrolyte is made in a transparent layer by way of evaporation. The element 5 is a photosemiconductor layer, which uses a transparent material such as CdS, ZnOSe, ZnS and organic semiconductor for the photosemiconductor. This photosemiconductor is composed by way of chemical vapor deposition, sputtering or ordinary evaporation. Said information storage body P is a plain transparent plate with respect to general appearance, and is a thin plate of approximate 0.075 − 3mm thickness as a whole body, with the support bodies 1, 1' and electrodes 2, 2' and the laminated coloring layer 3, electrolyte layer 4 and photosemiconductive layer. The element 7 is a power supply to impress a voltage of approximately 1V − 100V between the electrodes 2, 2', and is selectable in its polarity by means of a variable two-position switch S. When the contacts a and c are connected to the power supply 7 by the switch S so that the electrode 2', near the coloring layer 3 rather than the electrolyte layer 4, has a negative polarity, conduction is effected which permits the coloring of the information storage body P, while the conduction, which returns the color of its body P to the original, is effected when the switch S is changed over so that the contacts b and d are connected to the power supply 7.

In FIG. 1, when the light pattern A of approximately 200 lux is irradiated from the support body 1 side to the photosemiconductor, the resistance of the photosemiconductor layer 5 is lowered in its portion which receives the light irradiation. At the same time as the light irradiation, when the switch S is changed over so that the contacts a and c are connected to the power supply 7, conduction is effected between the electrodes 2 and 2' and about 1 − 100 seconds thereafter, the coloring layer 3 colors, corresponding to the light pattern. This coloring condition will be maintained even after the interruption of the power and the light irradiation. When the light is irradiated from the support body 1 side to the whole area of the information storage body P, after turning off the power following the complete coloring, an observer B can monitor the coloring pattern on the opposite support body 1' side, by the transmitted light through the non-coloring portion. In this case, real time monitoring is also possible by differentiating the spectral constituent of the photosemiconductor layer and the spectral wavelength of the observing light source or by using a filter. For erasing the coloring pattern, the light irradiation is to be performed from the support body 1 side, evenly to the whole area of the photosemiconductor layer 5 and at the same time, the switch S is changed over so that the contacts b and d are connected to the power supply 7, thereby the coloring layer 3 is restored to its original transparent state. The recording and erasing of this light pattern can be made repetitively.

Figure 1B:
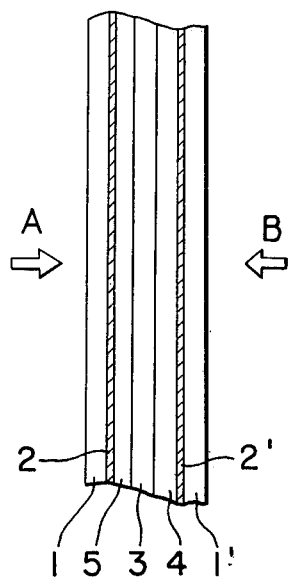

FIG. 1B shows an information storage body in which the coloring layer 3 and the electrolyte layer 4 are changed in their lamination order. In FIG. 1B, to color the coloring layer 3, the power supply is connected so that the electrode 2 becomes negative in polarity, contrary to the case of the aforementioned embodiment.

The information storage body of FIG. 1 is transparent as a whole and requires a transmission type for the coloring pattern observation. On the other hand, the coloring pattern can be observed in the reflection type by making one of the electrodes in the information storage body P, the photosemiconductor layer 5 or the electrolyte layer 4 an opaque layer. In the use of the reflection type, the photosemiconductor layer 5 or the electrolyte layer 4 is made opaque by adding a binder and (further a sensitizer to the photosemiconductor layer) to the aforesaid materials of these layers. For observation of the coloring pattern of the information storage body, the light is irradiated from the support body 1' side to the whole area of the layer after the coloring thereof and then, an observer B can read the coloring pattern in the real time mode on the support body 1' side by the reflected light from the coloring portion.

Figure 2:
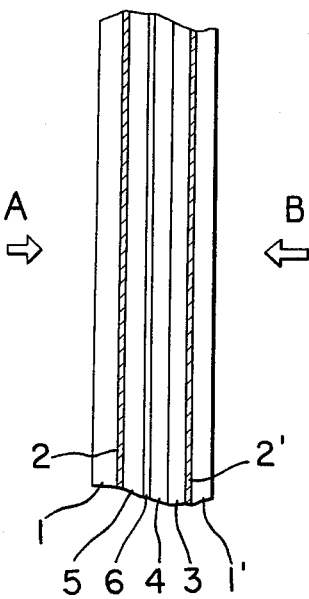
FIG. 2 shows an alternate embodiment of an information storage body.

FIG. 2 shows another embodiment of a reflection type information storage body, in which a conductive shading layer 6 is laminated between the photosemiconductor layer 5 and the electrolyte layer 4 of the information storage body shown in FIG. 1A. This shading layer 6 employs $Al_2O_3$ or $CaMoO_4$, for example, and selects a material having a light reflective characteristic, light absorptive characteristic or a light scattering characteristic. It is noted that the shading layer 6 may be laminated between the photosemiconductor layer 5 and the coloring layer 3 of the information storage body shown in FIG. 1B. Further, a layer mixing a photosemiconductor and an electrolyte in a single layer is also usable.

Figure 3A:
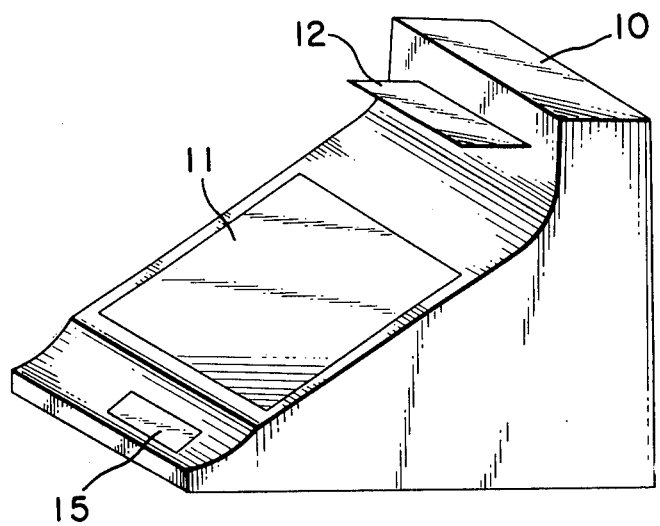
FIG. 3A is an elevation showing a film reader of the invention.
Figure 3B:
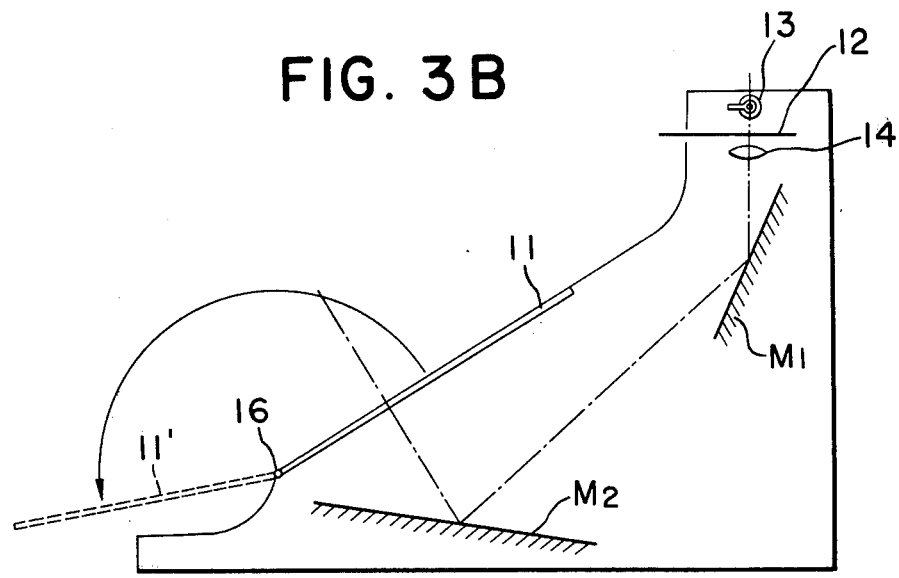
FIG. 3B is a cross section of the essential part of FIG. 3A.
Figure 4:
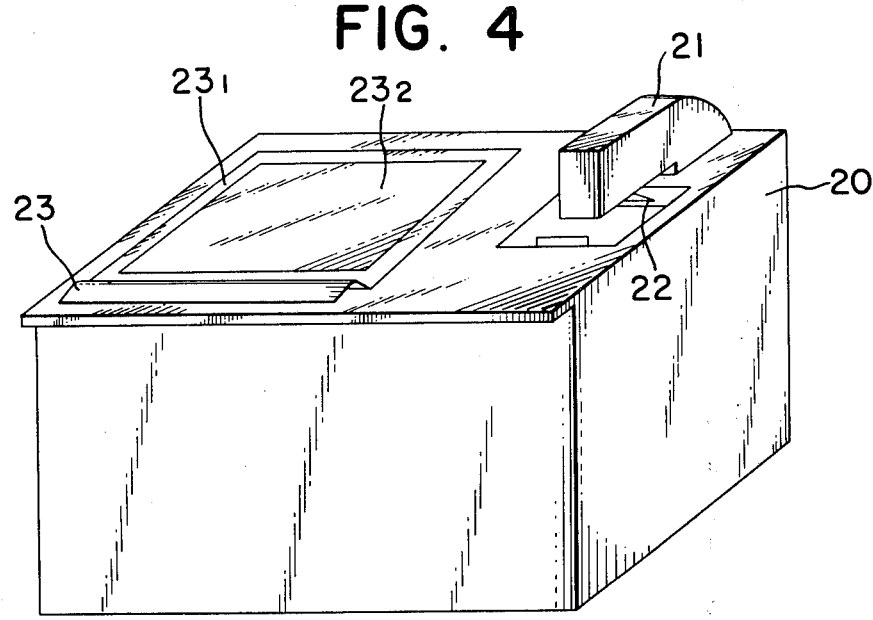
FIG. 4 is an elevation showing an alternate embodiment of a film reader.
Figure 5:
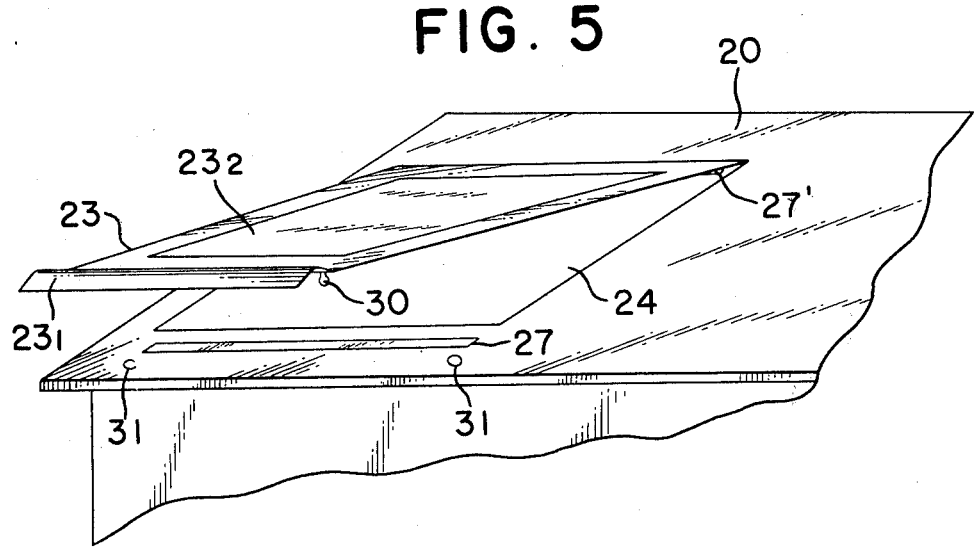
FIG. 5 is a description of the essential part of FIG. 4.

FIG. 3A shows a film reader in which the aforementioned information storage body is used as an observation screen. The element 10 is a case for the reader, and the element 11 is an observation screen comprising the information storage body shown in FIG. 1 or FIG. 2 and is inclined on the front of the case 10. For this screen 11, a reflection type screen is adopted, and the information storage body P, transparent as a whole body as shown in FIG. 1, is employed with a light absorptive plate or a scattering plate in contact with the back of its support body 1' so that the support body 1 is positioned inside the case 10 to prevent the incidence of external light. The element 12 is a microfiche disposed between a irradiation lamp 13 and a projection lens 14. The microfiche is held in a known holder, and laterally and reciprocally moved in the horizontal direction, thereby particular information is positioned in the projection path. In FIG. 3A, the element 15 is an operation panel, on which is mounted a power supply switch, an exposure adjusting dial and a polarity selector switch for the pair of electrodes 2, 2' of the screen 11. In FIG. 3B, the elements $M_1$, $M_2$ are fixed mirrors. The screen is made rotatable by the use of a hinge 16. After the information selected from the microfiche has been recorded on the screen 11 under the condition wherein the case 10 is closed by the screen, the screen 11 is rotated to the position indicated by the broken line 11' of FIG. 3B, centering around the hinge 16, and in this position, the information recorded on the screen can be observed. In the observation of the information, the film reader reads out the information more clearly even if the surroundings are brighter. Further, in this film reader, the reflection type information storage body of FIG. 1 or FIG. 2 can be used. In this case, the screen is all right to be left in fixing. FIG. 4 shows an alternate embodiment of a film reader which is a projection device for the observation of a large drawing and is generally called a microbox. In FIG. 4, the element 20 is a main body case, and likewise, the element 21 is a lighting unit with a lighting lamp; the element 22 is an aperture card disposed downward of the lighting unit 21 and the element 23 is a holder plate for a screen. Disposed in the case 20 are a projection lens and a reflection mirror. As shown in FIG. 5, the holder plate 23 comprises a frame 23 consisting of insulation material openably mounted on the upper surface of the case 20 and a filter $23_2$ supported by the frame 23 for intercepting particular wavelengths. Disposed on the upper surface of the case 20, opposite the holder plate 23, is a transparent glass plate 24, on which the image of the aperture card 22 is projected in an enlarged form. A screen 25, shown in FIG. 6, is dismountably disposed between the holder plate 23 and the glass plate 24. For this screen 25, a transmission type information storage body, or a reflection type information storage body is used. As shown in FIG. 6, the contacts 26, 26', connected to a pair of electrodes 2, 2' of the information body, extend to the side of the screen 25. Each of the contacts 26, 26' protrudes over one side to prevent uneven coloring. With the screen 25 adapted between the holder plate 23 and the glass plate 24, slots 27, 27' are arranged on the upper surface of the case 20, corresponding to the contacts 26, 26' of the screen 25. As shown in FIG. 7, a round rod 28 and a conductive brush 29 mounted on a plate $29_1$ vertically rotatable by the rotation of the round rod 28, are arranged in the slots 27, 27'. The round rod 28 is accentrically supported by a shaft $28_1$ and it engages plate $29_1$ on its inner surface. The shaft $28_1$ is coupled to a drive motor. Further, a pair of conductive protrusions 30 are provided, respectively, on the lower sides of the front and rear of the holder plate frame $23_1$, and an opening 31 on the upper surface of the case 20 corresponds to each protrusion 30. A switch is provided in the opening 31. When the holder plate 23 is closed (the position shown in FIG. 4) with the screen 25 adapted, the protrusion 30 of the frame 23 enters into the opening 31 of the case 20 and actuates the switch therein, and thus the drive motor, coupled to the shaft 28, starts to rotate the round rod 28, thereby the rod 28 moves from the position indicated by the broken line to the solid line position as seen in FIG. 7, and stops there. As a result, the conductive brush 29 rises in the slots 27, 27' and touches the contacts 26, 26' of the screen 25 disposed between the holder plate 23 and the glass plate 24, thereby the pair of electrodes 2, 2' of the screen is supplied with a voltage through the conductive brush 29. When the holder plate 23 is released, the conductive brush 29 is moved in the slots 27, 27' to protect the operator from an electric shock suffered by touching the brush 29. A filter $23_2$ of the holder plate 23 is a filter to intercept the wavelength in the wavelength region of the spectral sensitivity possessed by the photosemiconductor of the information storage body used for the screen 25. For example, if the photosemiconductor has the spectral sensitivity for blue, a filter to intercept the blue color is used. To enable the observation of the reflected light from the coloring layer, this film reader overcomes the defects of a conventional microbox, in which an image can not be clearly seen unless the screen is vertical with respect to the floor and the observation is performed in a dark place. Since said film reader permits the observation of the image on a screen in a clear manner even in the open light, for example, having the shape just like a desk, an image can be obtained by placing a screen at a position corresponding to the upper plate of the desk and projecting it from the lower side thereof.

FIG. 8 shows the usage of the screen of FIG. 6, divided into two independent observation screens. In FIG. 8, the screen comprises a first screen 40 and a second screen 42. Each of the screens 40 and 42 is provided with a pair of contacts 41, 41' and 43, 43' connected to the electrode. These screens 40 and 42 are independently supplied with voltage. Each screen records a separate image (for example, a drawing on the first screen and the description of the drawing on the second one) to enable an observation by referring to the two images. FIG. 9A shows an embodiment of the usage of the screen shown in FIG. 6, divided further into many portions A' - N'. As shown in FIG. 9B, this screen is suitable for using a microfilm 50, having the format of informations A - F. In short, the portion of the image A of the microfilm of FIG. 9B is projected in an enlarged form on the portion of the screen A' of FIG. 9A, and only the portion A' is conducted, thereby recording the image. Likewise, the images B - F of the microfilm 50 are recorded on the screens B' - F' thereby the images of each portion can be comparatively observed by referring to each other on the screen.

FIG. 10A shows another embodiment of a screen, in which one portion 60 of the screen is a screen, using the aforementioned information storage body and the other portion 60 is a known transmission type screen, in which a light scattering substance is dispersed on the transparent base plate and which is a hard plate, in general. The elements 61, 61' are contacts connected to the electrodes 2, 2' of the screen 60. As shown in FIG. 10B, this screen is laterally, slidably arranged on the projection plane of the film reader along a guide groove 64 provided on the front surface of the case 63. Provided in the guide groove 64 is a conductive brush which touches the contacts 61, 61'. This reader firstly projects a ledger, for example, on the recordable screen 60 and records it, and thereafter, slides the screen 60 in said guide groove to place an ordinary known type of screen 62 on the projection plane of the film reader, and then successively compares manner of the image obtained on the recordable screen. This is the manner of operation of this film reader. After recording the film image, the aforementioned demountable screen is dimounted from the screen position of the microreader section and observed as one sheet of paper. This is not a real hard copy, but it has the advantage of permitting several uses of the screen. In addition, when a read hard copy is desired, the image obtained on this screen can be copied by the use of a copying apparatus, just like copying from ordinary paper. In a film reader, which uses the information storage body of FIG. 1 and FIG. 2 as a screen, the support body 1 of the screen, the electrode 2 and the photosemiconductor layer 5 may be fixed on the projection plane of the film reader, and the remaining support body 1', electrode 2', coloring layer 3 and electrolyte layer 4 or the shading layer 6 may be demountably constructed as a single body.

FIG. 11 shows still another embodiment of a film reader. In the same drawing, the element 69 is a main body case, and likewise, the element 70 is an irradiation light source; the element 11 is a condenser lens; the element 72 is a reflector mirror; the element 73 is a film carrier to house an original picture microfilm F; the element 74 is a projection lens and the element 75 is a shutter that comes in and out of the light projection path. The elements 76, 77 are reflector mirrors, the elements 74, 78 are whole area exposure light sources to evenly irradiate the screen 79 in its whole area; the element 80 is a group of switches arranged on the operation panel of a main body case 69. For the screen 79, a reflection type information storage body, shown in FIG. 1 and FIG. 2, is used. In this case, a color, that provides easy observation of the portion colored by the coloring layer, is selected for the transparency of the information storage body. The information storage body is arranged at the front opening part of the case 69 so that the support body 1 is positioned inside the case. The support body 1', facing to the open light side, is constructed as a filer to intercept particular wavelengths (the spectral sensitivity of a photosemiconductor).

FIG. 12 shows a control section of said film reader. In the drawing, the element 81 is a switch to select the negative and positive of an original picture film F, the element 82 is a switch to select the negative and positive of an image to be observed, that is, to select a film and an image of the same positive and negative or a different positive and negative, and the element 83 is a switch for erasing. The element 84 is a control circuit to selectively control the light irradiated to the screen and the polarity of the impressed voltage; the element 85 is a whole area exposure light source operation circuit; the element 86 is a first voltage supply circuit to impress the voltage to let the coloring layer 3 color, mounted between transparent electrodes 2, 2'; the element 87 is a shutter drive circuit to open and close the shutter 75 and the element 88 is a second voltage supply circuit to impress a voltage with an inverse polarity with respect to the former voltage, between the transparent elecrodes 2, 2' in order to change the coloring layer 3 towards its original color.

In the above mentioned device, a negative film is used for the microfilm F, and when an image having a different negative and positive from said film is observed, the irradiation light source 70 is turned on, the selector switch 81 is changed over to the negative film position, and the selector switch 82 is properly changed over to observe the positive image of the different property of said film. Then, by the control circuit 84, the first voltage supply circuit 86 operates in the channel indicated by the dotted line a to impress a voltage on the screen 79 and at the same time, the shutter drive circuit 87 actuates to open the shutter 75, and the image of the film F is projected on the screen 79. It is noted that the operation sequence of the first voltage supply circuit 86 and the shutter drive circuit 87 is no problem in this case. Further, the first voltage supply circuit 86 and the shutter drive circuit 87 will become inoperative after the preset time by the useof a timer or other similar device. As a result, due to the electrocromy phenomenon, the positive portion of the original picture image will change in color on the screen, and the positive image with the different positive and negative from the original image will appear on the screen 79 and, thus, an observer can see the image on the front surface of the screen. This image will be stored and maintained on the screen even after the impressed voltage is eliminated. Next, for the observation of an image with the same positive and negative as said film, the selector switch 82 is changed over to observe the negative image of the same property as the film. Then, by the control circuit 84, the whole area exposure light source operation circuit 85 will operate for a preset time in the channel indicated by the solid line b so that the whole area of the screen is irradiated by the light from the light source 18 and, at the same time, the first voltage supply circuit 86 will operate for a preset time to impress a voltage on the screen 79. As a result, as seen from the observer side, the screen 79 will change color in the whole area. In this case, also, the operation sequence of the light source operation circuit 85 and the first voltage supply circuit 86 is not a problem. Thereafter, by the control circuit 84, the shutter drive circuit 87 will operate for a preset time to open the shutter 75, and the second voltage supply circuit 88 will operate for a preset time to impress a voltage of inverse polarity onto the screen 79, and in addition the image of the film F will be projected on the same screen. The operation sequence of the shutter drive circuit 87 and the second voltage supply circuit 88 is not a problem. As a result, due to the electrocromy phenomenon, the positive portion of the original picture image will be faded out on the screen, and the negative image with the same positive and negative property as the original picture will appear on the screen 79 and be observed on the front surface of the screen. This image will be stored and maintained even if the impression of the voltage is interrupted. In storing an image on the screen 79, the photosemiconductor layer 5 is inevitably affected by the so-called open light. To prevent this, the screen 79 is arranged to be partially shielded from the open light when the voltage is applied between the electrodes, or a blue filter, for example, to intercept a particular wavelength of light, is adapted for the transparent base plate 1' on the open light side, and a photosemiconductor sensitive to a particular wavelength of light, for example, the light within the wavelength region of the color blue, may be employed. In addition, the emission wavelength of the light source is properly selected, and the light beam with the ultraviolet wavelength, for example, is used, and a photosemiconductor with the spectral sensitivity for this ultraviolet wavelength may be selected. To erase the image stored on the screen, the eraser switch 83 is set to its erase position. By this switch action, the control circuit 84 is actuated, and the whole area exposure light source operation circuit 85 operates for a preset time in the channel indicated by the line C so that the whole area of the screen is irradiated by the light from the light source 18 and, at the same time, the second voltage supply circuit 88 operates for a preset time to impress a voltage on the screen 79. As a result, the stored image will be erased, and the screen 79 is restored to its original state, to permit the next observation of the projection. If the original picture film is a positive image film, the above description is applicable and, thus, the detail explanation is not repeated. In the above embodiment, the emission light source 70 may be turned on and off instead of the shutter being opened and closed. When the film reader is placed in bright surroundings, the open light may be utilized for the whole area irradiation instead of the light source 78, to irradiate the whole area of the screen. Further, in the above embodiment, a non-transmission type information storage body is used for a screen, and it may be replaced by the transmission type information storage body shown in FIG. 1. In this case, the support body 1' is constituted by a filter. It is also noted that the coloring density of the screen is controlled by varying the operation time of each voltage supply circuit.

As previously described, according to a reader or a reader printer of the invention, the selective observation of the image with the same or a different positive and negative property with respect to the original film is possible from the same original picture image film, with the effect that the reader or reader printer usage becomes more convenient.

FIGS. 13 – 17 show an alternate embodiment of a flim reader, which enables the selective observation of the image with the same or a different positive and negative property with respect to the original image, like the reader of FIG. 2.

In FIG. 13, the element 100 is a light source, and likewise, the element 101 is a condenser lens; the element 102 is an original picture microfilm; the element 103 is a projection lens and the element 104 is a relfector mirror, rotatably disposed on the projection path. Further, the numeral 105 represents an observation and eraser light source, to irradiate the whole area of a projection screen 107, when the reflector mirror 104 is rotated to its dotted line position b, and the numeral 106 indicates a lens. For the screen 107, disposed on the projection plane, the transmission type information storage body shown in FIG. 1 is used, having a light scattering substance dispersed on its support body 1'. Therefore, this screen is of the transmission type. The support body 1' is constituted by a filter to protect the other layer from the open light.

In the above device, when an image, having the same positive and negative property as the microfilm 102, is observed with a negative film used as the microfilm 102, the reflector mirror 104 is placed at the solid line position and the light source 100 is turned on to project the image of the film 102 on the surface of the screen 107. Then, the projection light is projected on the screen 107 through the reflector 104, and the negative image, with the same property as the original picture image, appears on the screen 107 as in an ordinary film reader, and an observer can see the negative image on the front surface of the screen. Next, to observe an image with a different positive and negative property with respect to the microfilm 102, voltage is applied between the transparent electrodes 2, 2' of the screen, under the condition wherein the image of the microfilm 102 is projected on said screen 107. Then, due to the electrocromy phenomenon, the positive portion of the original image will change color on the screen surface, and an image with a different positive and negative property will be obtained. This image will still be stored and maintained, even when the impressed voltage is eliminated. For the observation of this image, the light source 100 is turned out, no voltage is applied between the transparent electrodes 2, 2', the reflector 104 is rotated to the position b and the screen 107 is arranged to be evenly irradiated on its whole area by the light, passed through the lens 106 and the reflector 104, from another light source 105, thereby an observer is permitted to see the positive image on the front surface of the screen 107. When the image is recorded on the screen 107, the photosemiconductor layer 5 is inevitable effected by the light from the observer side, or the so-called open light. To prevent this, the screen 107 is arranged to be partially shielded from the open light upon the image recording, or a blue filter, for example, to intercept a particular wavelength of light, is used for the transparent base plate 1 on the open light side, and a photosemiconductor is constituted by one sensitive to a particular wavelength of light, for example, the light within the wavelength region of the color blue. To erase the positive image on the screen, the reflector 104 is located at the position b and the screen 107 is arranged to be irradiated in its whole area by the light from the light source 105, under the condition wherein the voltage applied to the transparent base plates 2, 2' is of inverse polarity with respect to the former voltage therebetween. By this action, the image will be erased in preparation for the next observation of the projection. When using a positive film, the selective observation of the image, with the same or a different positive and negative property with respect to the original picture film, is possible in a similar manner, as in the previously described case.

Figure 14:
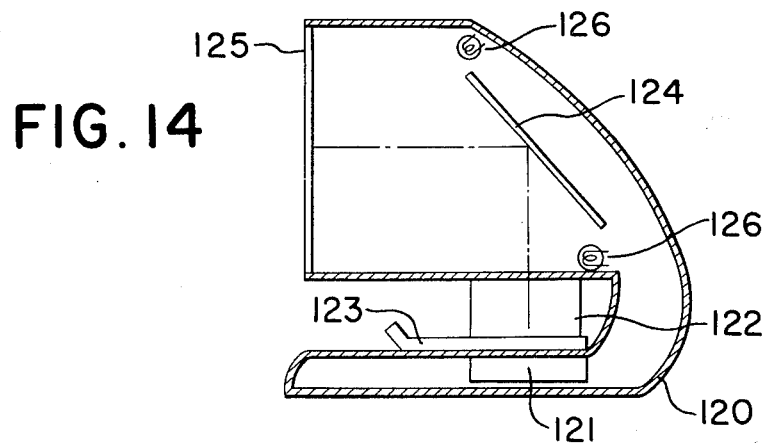

FIG. 14 shows another embodiment of the invention. The element 120 is a main body case; the element 121 is an emission light source system; the element 122 is a projection lens system; the element 123 is a carrier for holding an original picture microfiche; the element 124 is a reflector mirror; the element 125 is a projection screen disposed on the front surface of the main body case 120, and the element 126 is an observation and eraser light source, to evenly irradiate the rear surface of the screen 125. The emission light source system 121, the projection lens system, and the screen 125, are the same as in the case of FIG. 13.

In the above embodiment, when the image with the same positive and negative property as the original image is observed, similar to the embodiment in FIG. 13, no voltage is impressed between the transparent electrode 2, 2' of the screen 125, and the image selected from the microfiche is projected on to the screen 125 through the reflector 124, thereby the desired image is observed on the screen. When a image with the different positive and negative property with respect to the original image is observed, also similar to the embodiment of FIG. 13, the transparent electrodes 2,2' of the screen is impressed with a voltage therebetween to record the image on the screen 125, under the condition with the image projected on the screen 125, and thereafter the light source 126 is turned on while applying no voltage between the electrodes, thereby the desired image is observed on the screen. To erase the image on the screen 125, the light source 126 is turned on under the condition wherein the transparent electrodes are impressed with a voltage of inverse polarity with respect to the previous voltage therebetween, whereby the screen 125 is restored to its original transparent state.

Figure 15:
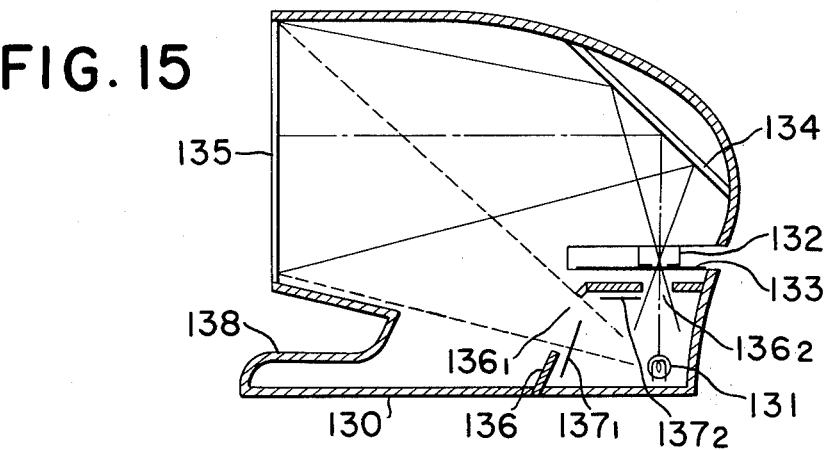

FIG. 15 shows still other embodiment of the invention. The element 130 is a main body case; the element 131 is an emission light source; the element 132 is a projection lens system and the element 133 is an original picture film, which uses a microfiche or a roll microfilm and the desired frame is placed under the projection lens system 132 by the operation of an operation board. Likewise, the element 134 is a reflector mirror and the element 135 is a projection screen, which is the same as that of the embodiment of FIG. 13. Further, the element 136 is a shading plate, enclosing the emission light source 131 and having two openings 1361 and 1362. The elements 1371 and 1372 are shutters to open and close the openings 1361 and 1362, respectively.

In the above device, if the opening 1361 is closed by the shutter 1371, the opening 1362 is opened by removing the shutter 1371 therefrom, and the light source system 131 is turned on, and an image of the same positive and negative property, as the original image, is observed on the screen 135. Next, in this condition, if a voltage is applied between the transparent electrods of the screen 135 to record the original picture film image on the screen and thereafter, while no voltage is applied between the transparent electrodes, the opening 1362 is closed by the shutter 1371 and the opening 1361 is opened by removing the shutter 1371 therefrom, then an image of a different positive and negative property with respect to the original image, is observed on the screen 135. Thenm if the voltage of inverse polarity, with respect to the previous impressed voltage, is applied between the transparent electrodes of the screen 135, the image on the screen 135 can be erased.

Figure 16:
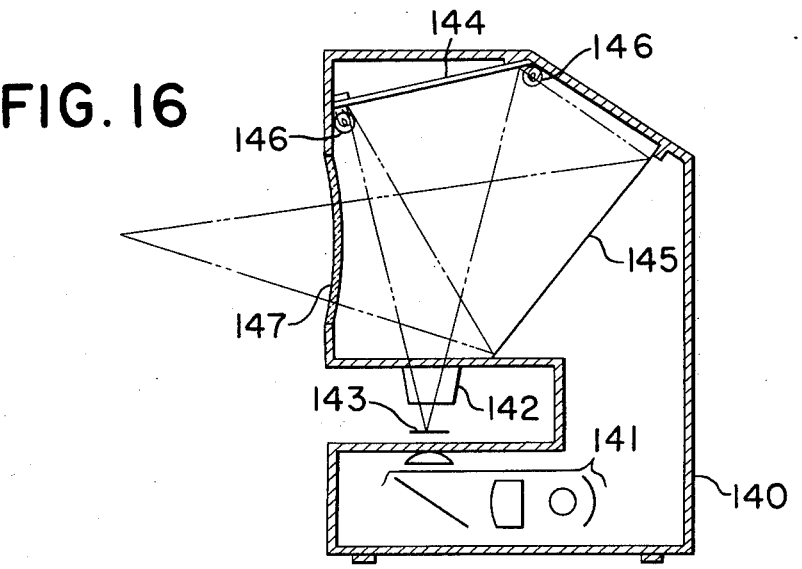

FIG. 16 shows an embodiment in which a reflection type screen is used instead of the previously mentioned transmission type. The element 140 is a reader main body, and likewise, the element 141 is an emission light source system; the element 142 is a projection lens system; the element 143 is an original picture film; the element 144 is a reflector mirror and the element 145 is a reflection type screen. The reflection type screen 145 employes, for example, the transmission type information storage body of FIG. 1, with its support body opaque, or the transmission type information storage body of FIG. 1, or the reflection type information storage body shown in FIGS. 1 and 2.

Further, the element 146 is an observation and eraser light source to evenly irradiate the whole area of the screen 145, and the element 147 is a filter to transmit or absorb the light of a particular wavelength.

In the above device, when the emission light source system 141 is turned on, as in a known relfection type reader, an observer can see the reflected image on the reflection type screen through the filter 147. This reflected image is an image with the same positive and negative property as the original picture film. Next, in this condition, when a voltage is applied between the transparent electrode of the screen 145 to record the image on the screen, and thereafter the light source is turned on when applying no voltage, then the image with a different positive and negative property with respect to the original image, can be observed through the filter 147.

Figure 17:
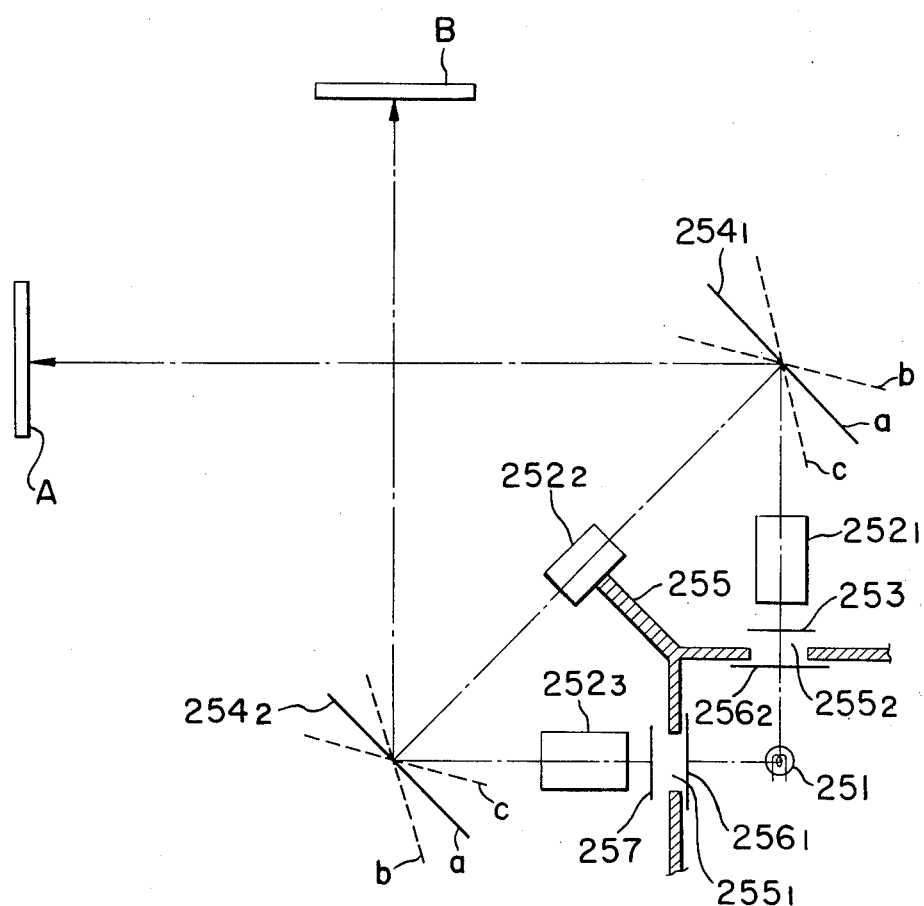
FIG. 17 shows an embodiment of a reader printer.

FIG. 17 shows an embodiment of a reader printer. The element A is a known transmission type, or reflection type screen, disposed on the first projection plane, and the element B is a print mechanism disposed on the second projection plane, on which a photosensitive paper is mounted. Likewise, the element 251 is an emission light source system; the element 2521, 2522 and 2541 are first reflector mirrors, and the element 2542 is a second rotatable reflector mirror. Further, the element 255 is a shading plate, enclosing the emission light source system 251 and having two openings 2551 and 2552, and the elements 2561, 2562 are shutters, to open and close the openings 2551 and 2552, respectively. The element 257 is a transmission type information storage body as shown in FIG. 1.

In the above device, when an image, with the same positive and negative property as the original picture film 253, is observed or printed, the image of the same property as the original picture will be observed if the opening 2551 is closed by the shutter 2561, the opening 2552 is opened by removing the shutter 2562 therefrom, the light source system 251 is turned on, and then the first reflector 2541 is set to its position a, to project the image of the original picture film 253 on the screen A through the projection lens system 2521 and the first reflector 2541. An image with the same property as the original picture will be printed if the first reflector 2541 is set to the position b, and the second reflector 2542 is set to the position c to project the image of the original picture image film 253 to the print mechanism B, through the lens system 2521, the first reflector 2541, the projection lens system 2522 and the second reflector 2542. It is noted that in this case, the projection lens systems 2521 and 2522 are previously adjusted so that the film image should be focussed on the print mechanism B. Next, for the observation or printing of an image with a different positive and negative property with respect to the original picture film 253, while setting each of the shutters 2561 and 2562 to the previously described positions, the first reflector 2541 is set to the position b, and then the second reflector 2542 is set to the position b to project the image of the original picture film 253 onto the information storage body 257 through the projection lens 2521, the first reflector 2541, the projection lens system 2522, the second reflector 2542 and the projection lens system 2523, and in this condition, the voltage is applied between the transparent electrodes of the information storage body 257, thereby to temporarily record the image on the storage body 257. In this case, the projection lens systems 2521, 2522 and 2523 are previously adjusted so that the image of the film should be focussed on the information storage body 257. Thereafter, while applying no voltage between the transparent electrodes, the opening 2552 is closed by the shutter 2562, the opening 2551 is opened by removing the other shutter 2561 therefrom, the first reflector mirror 2541 is set to the position c and the second reflector mirror 2542 is set to the position b, to project the recorded image of the information storage body 257 onto the screen A through the projection lens system 2523, the second reflector 2524, the projection lens system 2522 and the first reflector 2541, and then an image, with a different property with respect to the original picture, willl be observed on the screen. In this case, each of the projection lens systems 2521, 2522 and 2523 is previously adjusted, so that the image stored on the information storage body 257 should be focussed on the screen A. Further, with each shutter condition unchanged, if the second reflector 2542 is set to the position c and the image of the information storage body 257 is projected to the print mechanism B through the projection lens system 2523 and the second reflector 2542, then the image, with a different property with respect to the original picture, will be printed. In this case, the projection lens system 523 is previously adjusted so that the image of the information storage body 257 should be focussed on the print mechanism B.

Figure 18:
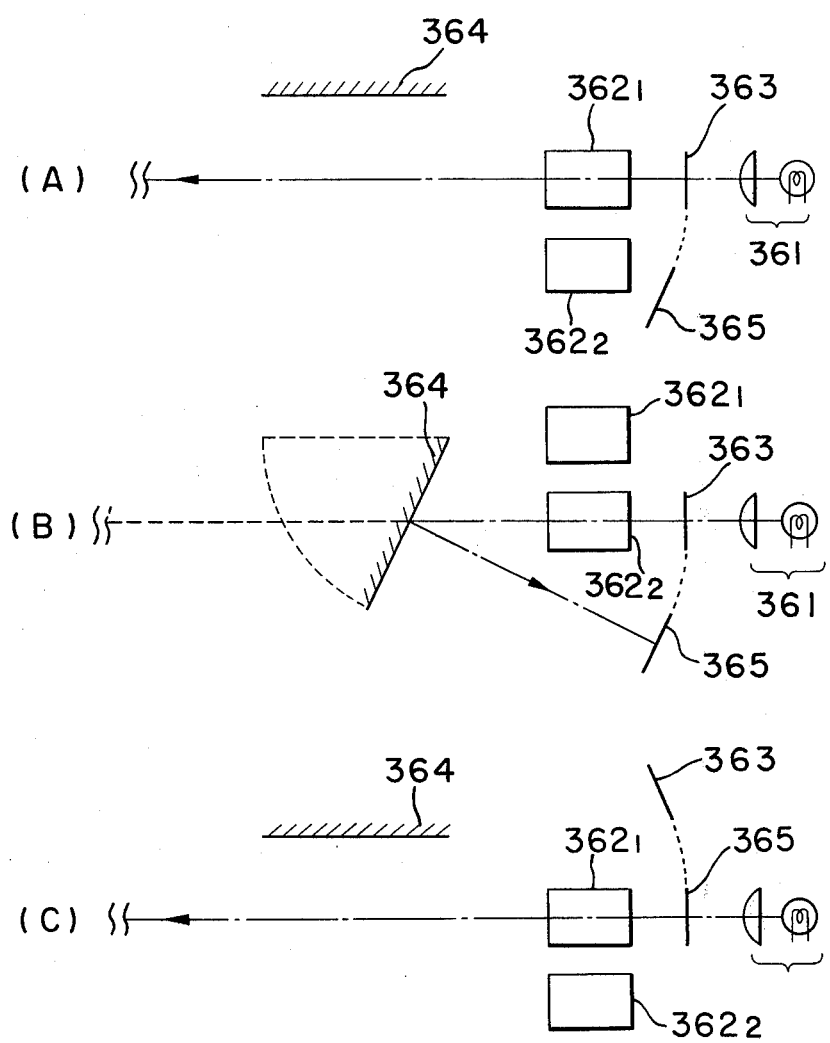
FIGS. 18A – 18C show still other embodiments of a film reader.

FIG. 18A — 18C show an alternate embodiment of a reader or a reader printer. The element 361 is an emission light source system; the elements 3621 and 3622 are projection lens systems the element 353 is an original picture film; the element 364 is a reflector mirror to be placed in and replaced from the projection path; and the element 365 is a transmission type information storage body as shown in FIG. 1. The projection lens systems 3621 and 3622, the original picture film 363 and the information storage body 365 are placed in and replaced from the optical path, respectively.

In the above device, when an image, with the same positive and negative property as the original picture film, is observed, as shown in FIG. 18A, the projection lens system 3621 is applied in the optical path, the reflector mirror 364 is replaced from the path and the image of the original picture film 363 is projected on to a known screen (not shown) or print mechanism, by the emission light source system 361 and, then the image with the same property as the original picture will be observed or printed. Next, when an image of a different positive and negative property with respect to the original picture film 363, is observed or printed, firstly, as shown in FIG. 8B, while the other projection lens 3622 and the reflector mirror 364 are placed in the optical path instead of the projection lens 3622, the voltage is applied between the transparent electrodes of the information storage body 365, and the image of the original picture film 363 is projected on the information storage body 365, thereby temporarily recording the film image on the information storage body 365. Thereafter, as shown in FIG. 18C, the projection lens 3622 is dismounted and replaced by the other projection lens 3621, the reflector 364 is removed from the optical path, the information storage body 365 is placed in the path instead of the original picture film 363, and the image recorded on the information storage body 365 is projected on the screen or print mechanism, by means of the light source system 361 and, then the image with the different property with respect to the original image will be obtained or printed.

Figure 19:
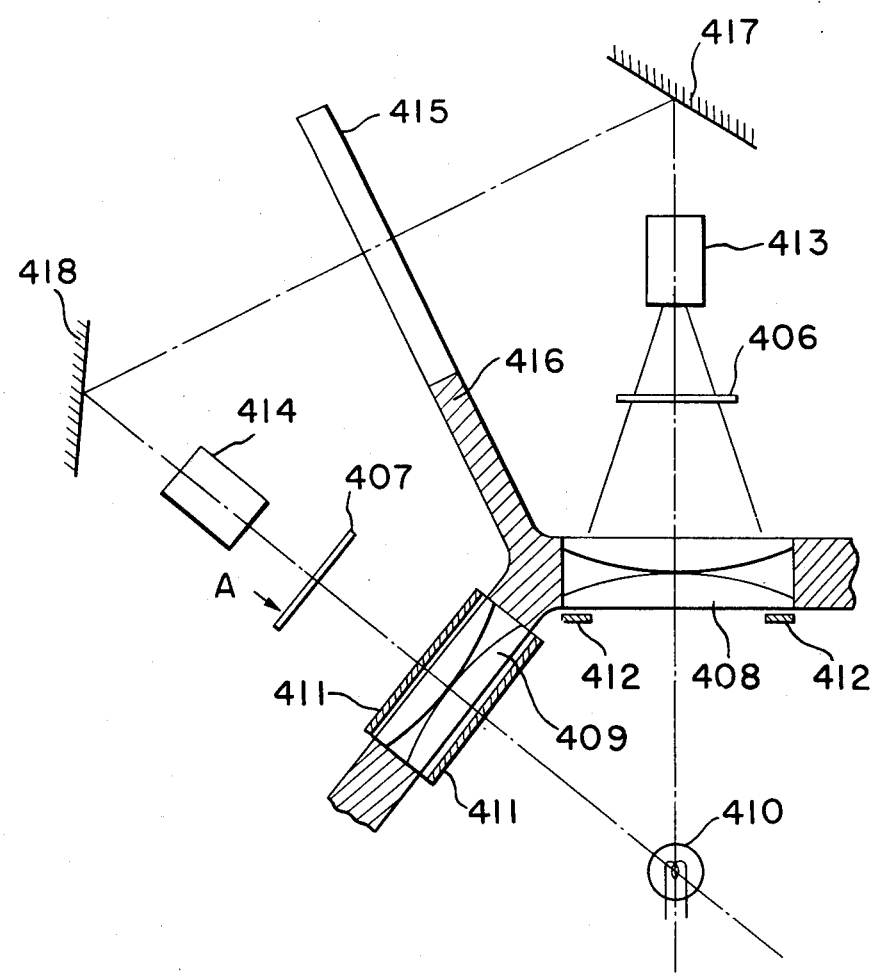
FIG. 19 is a block diagram of an essential part showing other embodiments of a film reader.
Figure 20:
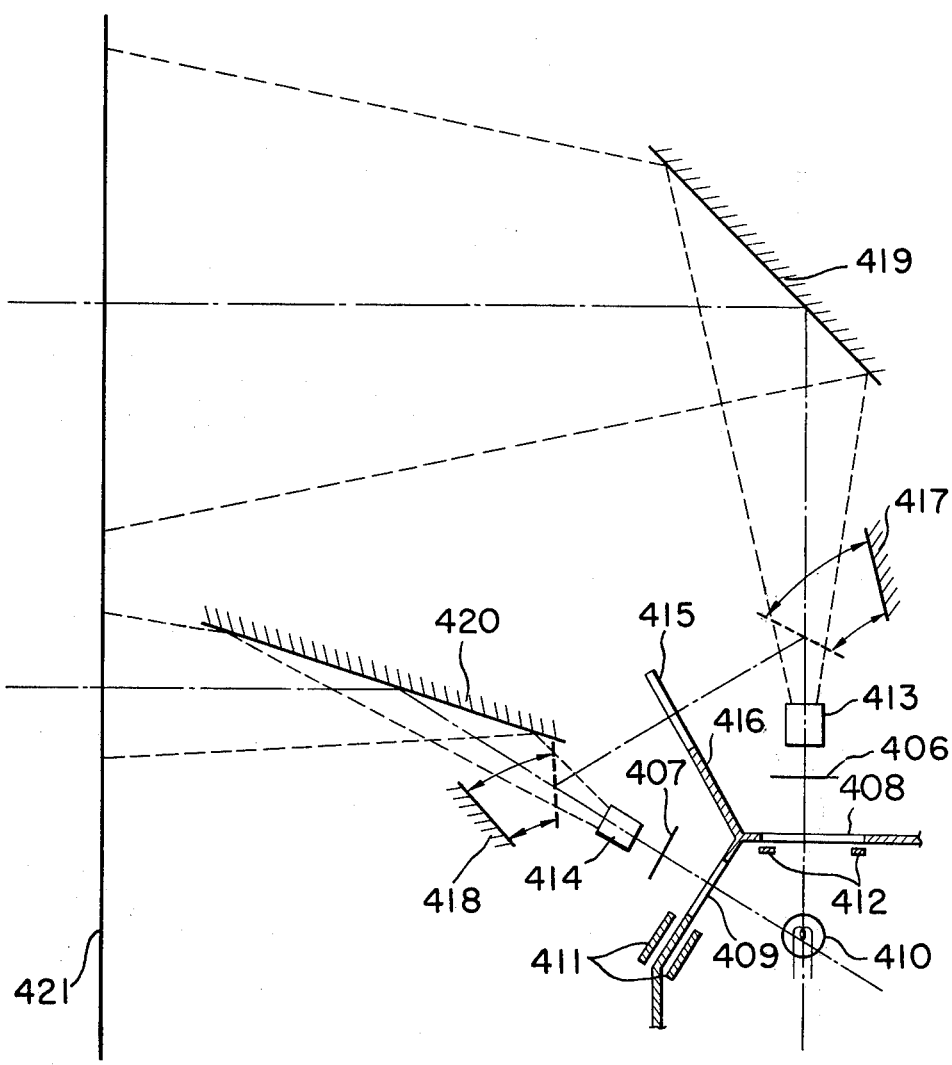
FIG. 20 is a general block diagram of the film reader of FIG. 19.

FIGS. 19 – 24 show a film reader which permits the simultaneous observation of at least two individual informations. FIG. 19 indicates the lighting, projection and recording sections of the film reader. The element 406 is an ordinary original picture film. In this embodiment, a roll film of 16mm is assumed. The element 407 is a transmission type information storage body as shown in FIG. 1. The elements 408 and 409 are condenser lenses to concentrate the light, and may be identical to each other. The element 410 is a light source. The elements 411 and 412 are a shutter and an iris, respectively. The elements 413 and 414 are a lens system to focus the image, and may be identical ones in this case. The element 415 is a lens to focus an image, upon memorization. The element 416 is a shading plate to prevent the reflected light from reaching the information storage body 407, upon the irradiation of the light to the film 406, and the elements 417, 418 are mirros. These mirrors 417 and 418 of the shutter 411 and the iris 412 are movable in an optional manner and operable with the control panel on the front surface of the reader. FIG. 19 is a view of the recording on the information storage body 407. When the film image is not recorded, but directly projected on a known type screen on the front of the reader, the shutter 411 is opened, the mirrors 417 and 418 are arranged to not intercept each optical axis. This arrangement is shown in FIG. 20. Before explaining FIG. 20, FIG. 19 will be described. The light beam from the light source 410 is collimated with the condenser lens 408, passed through the lens system 413 via the film 406 and entered into the lens system 414 with the mirrors 417 and 418. At this time, if the distances between the lens systems 413, 415 and the lens systems 415, 414 are made equal, and the distances between the film 406 and the lens system 413 and between the information storage body 407 and the lens system 414, are also arranged to be equal, the light beam coming out of the lens system 414 will focus the same size image as that of the film 406, on the information storage body 407. At this time, the shutter 411 is closed and the iris 412 is also set to the position shown in FIG. 19. When an electric current is conducted between the transparent electrodes 2, 2' of the information storage body 407, with the image of the film 406 arranged to focus on the information storage body, the same picture image, as the film 407, is recorded on the information storage body 407. The largeness of the image to be obtained on the information storage body 407 depends on the focal distance of the lens systems 413, 414 and 415, the distance between each lens. In the case of this embodiment, the lens systems 413, 414 are made to have the same distance as the identical lens systems 415, 413 and 414, so as to obtain the same size image.

Figure 21:
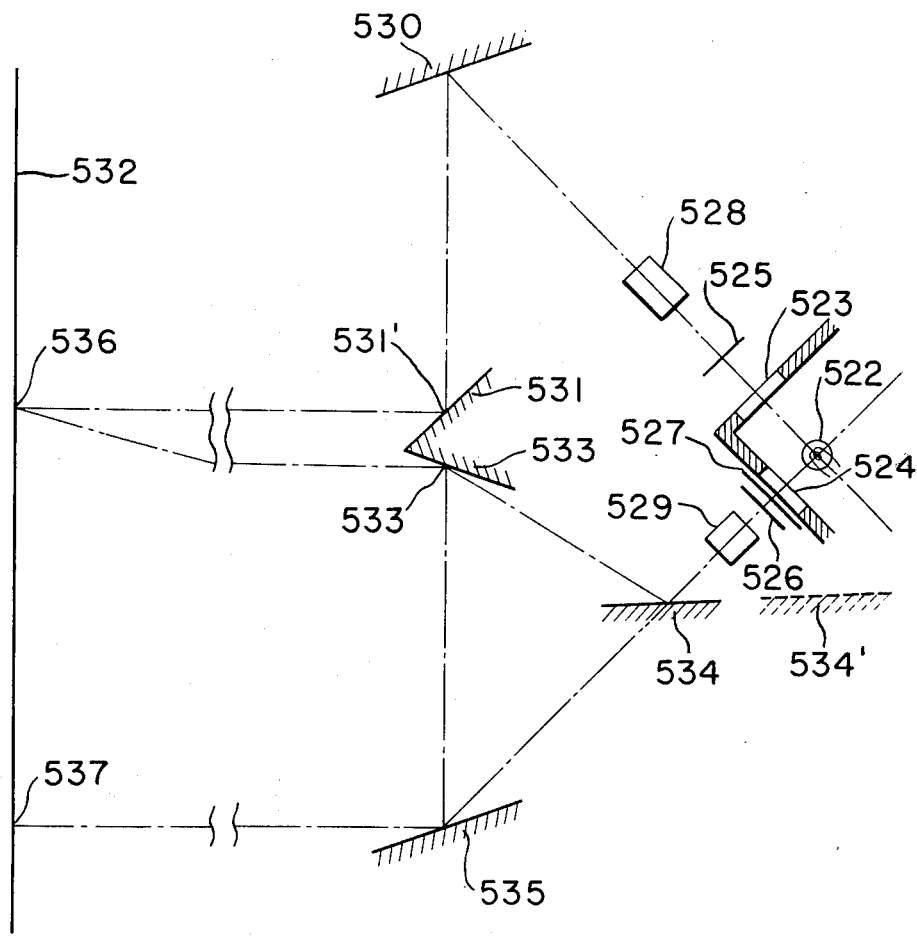
FIGS. 21 – 24 are block diagrams showing still other embodiments of a film reader.

FIG. 20 is a view of the projection on the screen. In this instance, the mirrors 417, 418 are moved so as to not intercept the optical axis, as in FIG. 20, and each light beam is directed to the known screen 421 via the mirrors 419 and 420. The shutter 411 is then, of course, opened. The iris 412 functions as described hereinafter. That is, it functions for the purpose of changing the size of the image, to be obtained on the screen 421, only in the two cases when the two images of the original film 406 and the information storage body 407, are projected on the screen 421, and when the image of the original film 406 is projected alone while not projecting the image of the information storage body 407. When the image of the original film 406 is projected alone, the projection is done with the iris 412 set in the open condition. When the above two images are obtained, the projection is effected with the iris 412 set in the close condition and the image is made smaller. The iris 412 makes the apertures of the lens systems 409 and 408 identical, when set in its closed condition. FIG. 21 is an embodiment of this device and a view of this screen, seening from the front side. The solid line drawn inside of the external frame of the screen, indicates the manner of image formation when two images are obtained, while the broken line indicates the image when only one image is seen, with the iris 412 set open.

Figure 22:
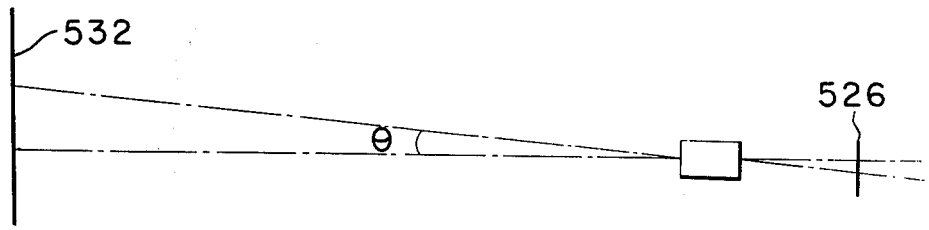

Other than the aforementioned embodiments, the system shown in FIG. 21 can be considered for its optical system. In FIG. 21, the element 522 is a light source lamp, and the elements 523, 524 are condenser lenses. These sections of the mechanism are almost the same as those in the embodiment shown in FIGS. 19 and 20. The element 525 is an original film, and the element 526 is a information storage body. The element 527 is a shutter to separate the two operations of recording and projection. Further, the elements 528 and 529 are projection lenses, of which the lens 529 is particularly compatible with the photographing lens, upon recording. The original film 525 is projected to a known screen 532 through the mirrors 530 and 531. For the recording on the information storage body 526, the following procedures are taken. That is, the image projected on the screen is transmitted to the mirror 534 through the mirror 533. The mirror 534 is made slidable and set in the position shown in FIG. 21, upon recording. The shutter 527 is of course set in its closed condition when recording. The light beam, passed via the mirrors 533 and 534, is focussed on the information storage body 526 by means of the lens system. When the image obtained in this way is projected, the shutter 527 is opened and the mirror 534 is slid to the position 534'. The light beam, through the information storage body, is focalized on the screen 532 by means of the mirror 535. If the optical path, initiated at the point 536 on the screen and reaching to the lens system 529 via the mirrors 533 and 534, is made identical to the path, initiated at the point 537 and reaching to the lens system 529 via the mirror 535, recording and projection can be performed without adjusting the lens system. Further, the light beam running from the point 536 on the screen to the lens system 529 via the mirror 533 and the optical path initiated at the point 537 on the screen and reaching to the lens system 529 via the mirror 535, are equivalent, as shown in FIG. 22. In other words, the angle 0 in FIG. 22 depends on the distance from the mirror 533 to the point 536 on the screen. However, since this distance is much larger as compared with that between the points 531' and 533' on the mirror 533, the angle 0 in FIG. 22 is very small. When it is necessary to correct the angle 0, the information storage body 526 is displaced with respect to the optical axis. As shown in FIG. 21, this embodiment differes from the one shown in FIG. 20 in that the former photographically records the image, once focussed on the screen.

Figure 23:
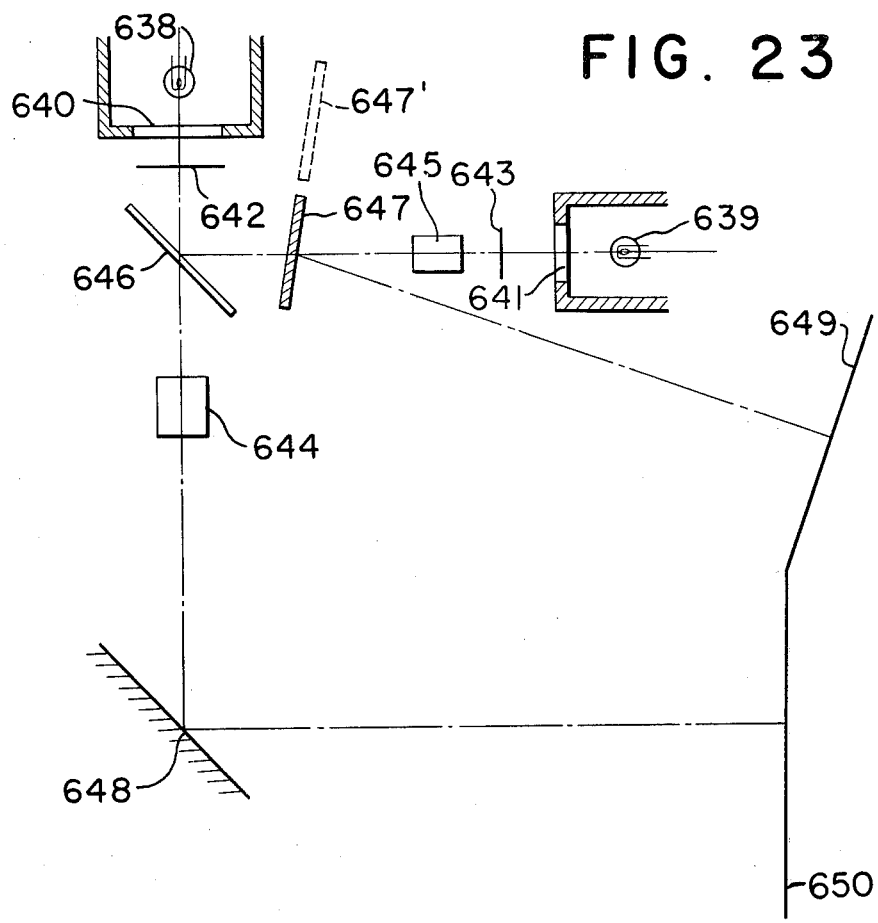

FIG. 23 is a still another embodiment. In this embodiment, two light sources are employed. The elements 638, 639 are light sources, and likewise, the elements 640, 641 are condenser lenses; the element 642 is an original film; the element 643 is an information storage body and the elements 644, 645 are projection lens systems. Further, the element 646 is a half-mirror; the elements 647, 648 are mirrors; and the mirror 647 is made slidable as indicated at 647 and the 647'. For recording on the information storage body 643, the mirror 647 is set to the position 647', and the recording is performed with the light source 639 turned out. For projection, the light source 639 is just turned on, with the mirror set to the position indicated by the solid lines in the drawing. The elements 649 and 650 are known type screens, and are somewhat different from the previous one because of their slight inclination. In this embodiment, the lens system 645 is changed in its magnification for recording and projection.

Figure 24:
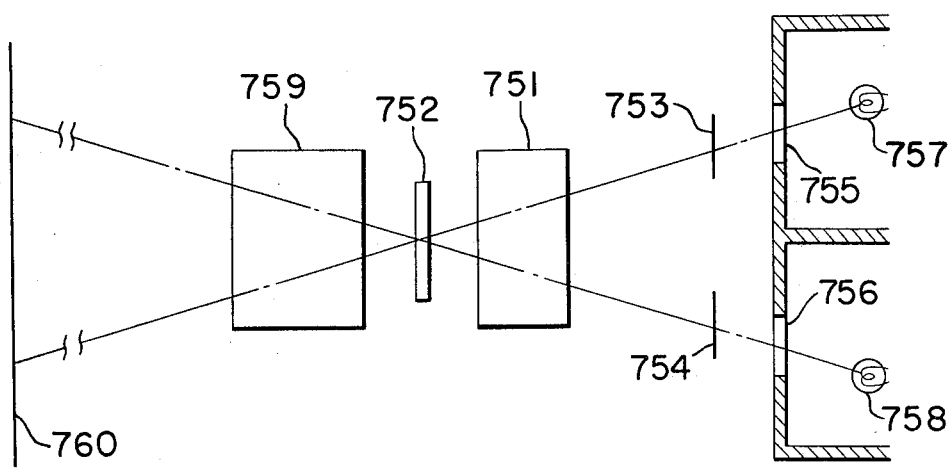

FIG. 24 shows another embodiment. In the same drawing, the elements 751, 759 are lens systems. The element 752 is a half-mirror or an ordinary mirror. The element 753 is an original film, likewise, the element is 754 is an information storage body; the elements 755, 756 are condenser lenses and the elements 757, 758 are light sources. If the element 752 is a half-mirror, it is unnecessary to shift the lens and mirror. The light beam, passed through the original film and the lens system 751, is partially reflected by the half-mirror 752 and focussed on the information storage body 754, through the same lens 751. For recording, the light source 758 is just turned out. The light beam, passed through the original film 753 and the lens system 751, passes to the screen 760 through the lens system 759. In this case, the light beam passed through the lens system 759 is, of course, available to be prolonged in the optical path by means of a mirror. When the image obtained on the information storage body 754 is projected, the light source 758 is just turned on. In this way, either recording or projection can be performed just by the turning on and off the light source 758. If a total reflection mirror is adopted for the mirror 752, the mirror 752 must be slided. This later way is rather efficient from the viewpoint of the light quantum.

Many embodiments have been referred to in the description heretofore. It is noted that each of these embodiments has the feature of being provided with an information storage body. This feature will enable one to observe a present image when referring to a previous one when, for example, a film is seen with a microreader when projecting in a magnified form.

We claim:

1. A film reader for observing an image recorded on film, comprising:
   a screen;
   a recording member having a photoconductive member and a material whose electromagnetic ray absorbing characteristics change in accordance with a voltage applied thereto;
   first projection means for selectively projecting an image of the film onto either said screen or said recording member;
   means for applying a voltage to said recording member to record the image of the film on the recording member; and
   second projection means for projecting an image of the recording member onto said screen.

2. A film reader according to claim 1, further comprising means for applying a voltage of a polarity opposite to that of said voltage applying means to said recording member to erase the image formed on said recording member.

3. A film reader according to claim 1, wherein said first projection means includes first lens means, first reflecting means which is movable between a first position wherein the image of the film is projected onto said screen and a second position wherein the image of the film is projected onto said recording member, and wherein said second projection means includes second lens means, second reflecting means which is movable between a first position wherein light of the image of the film which has been reflected by said first reflecting means is projected onto said recording member and a second position wherein the image of the recording member is projected onto said screen.

4. A film reader according to claim 3, wherein said first lens means is disposed between the film and said first reflecting means, and said second lens means is disposed between the recording member and said second reflecting means, the image of the film being projected onto said recording member through said first and second lens means.

5. A film reader according to claim 1, wherein said film and said recording member are both illuminated by a single light source.

6. A film reader according to claim 1, wherein said first projection means includes first lens means and first reflecting means, and said second projection means includes second lens means, third lens means and second reflecting means, said first reflecting means being movable between a first position wherein the light of the image of the film which has passed through said first lens means is projected onto said screen, a second position wherein the light of the image of the film which has passed through said first lens means is projected onto said second reflecting means through said third lens means, and a third position wherein the image of said recording member which has passed through said third lens means is projected onto said screen, and wherein said second reflecting means is movable between a first position wherein light of the image of the film which has passed through said third lens means is projected onto said recording member through said second lens means, a second position wherein the image of said recording member which has passed through said second lens means is projected onto a printing place, and a third position wherein the image of the film which has passed through said first and third lens means is projected onto the printing place.

7. A film reader according to claim 1, further comprising means for projecting the image which is being projected on said screen, also onto said recording member.

8. A film reader according to claim 1, further comprising half mirror means for projecting the image of the film onto said screen and said recording member.

9. A film reader according to claim 1, wherein the image of the film and the image of the recording member are projected onto different areas of said screen.

10. A film reader according to claim 1, wherein said recording member is optically transparent.

11. A film reader according to claim 1, wherein said material is electrochromic.

12. A film reader according to claim 1, wherein said recording member includes electrolyte material.

* * * * *

UNITED STATES PATENT AND TRADEMARK OFFICE
CERTIFICATE OF CORRECTION

PATENT NO. : 4,033,685
DATED : July 5, 1977
INVENTOR(S) : KEIICHI UNO, et al.

It is certified that error appears in the above-identified patent and that said Letters Patent are hereby corrected as shown below:

Column 5, line 31, change "accentrically" to -- eccentrically --.
Column 6, line 45, delete "manner of"; line 49, change "dimounted" to -- dismounted --; line 53, change "read" to -- real --.
Column 7, line 17, change "filer" to -- filter --; line 57, change "useof" to -- use of --.
Column 10, line 36, change "a image" to -- an image --; line 52, change "other" to -- another --.
Column 11, line 13, change "Thenm" to -- Then, --.
Column 12, line 43, change "willl" to -- will --.
Column 13, line 49, change "mirros" to -- mirrors --.
Column 14, line 51, change "is a" to -- is an --.
Column 15, line 2, change "focalized" to -- focused --; line 68, change "slided" to -- slidable --.

Signed and Sealed this

Fourteenth Day of February 1978

[SEAL]

Attest:

RUTH C. MASON
Attesting Officer

LUTRELLE F. PARKER
Acting Commissioner of Patents and Trademarks